No. 626,737. Patented June 13, 1899.
C. J. UNDERWOOD.
DENTAL APPLIANCE.
(Application filed Oct. 7, 1898.)
(No Model.) 2 Sheets—Sheet 1.

Witnesses: Inventor:
Chas. E. Gaylord, Chester J. Underwood,
By Banning & Banning & Sheridan,
Attys.

THE NORRIS PETERS CO., PHOTO-LITHO., WASHINGTON, D. C.

No. 626,737. Patented June 13, 1899.
C. J. UNDERWOOD.
DENTAL APPLIANCE.
(Application filed Oct. 7, 1898.)
(No Model.) 2 Sheets—Sheet 2.
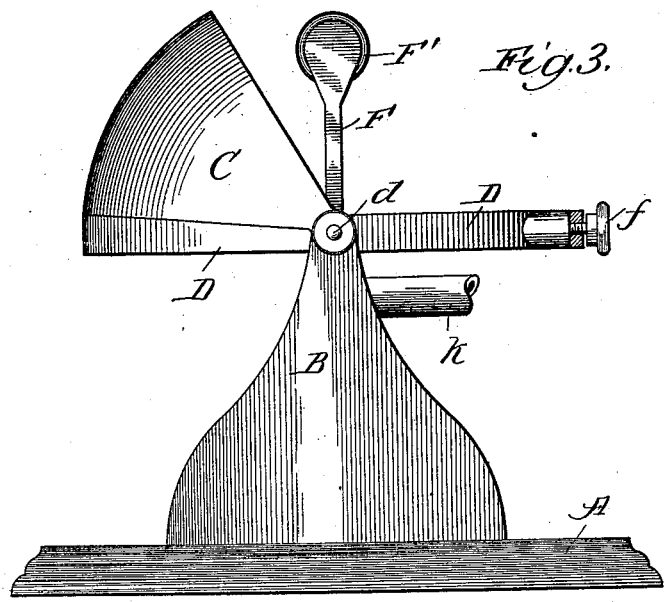
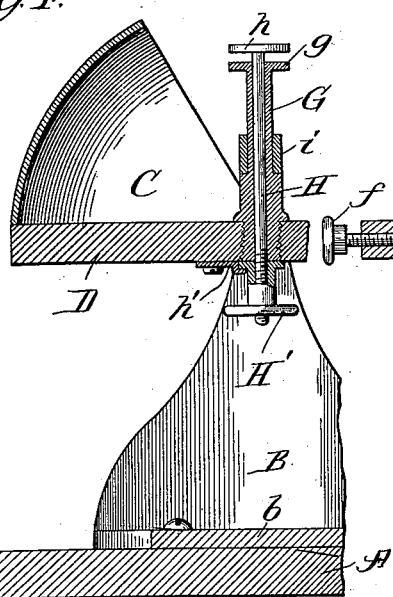
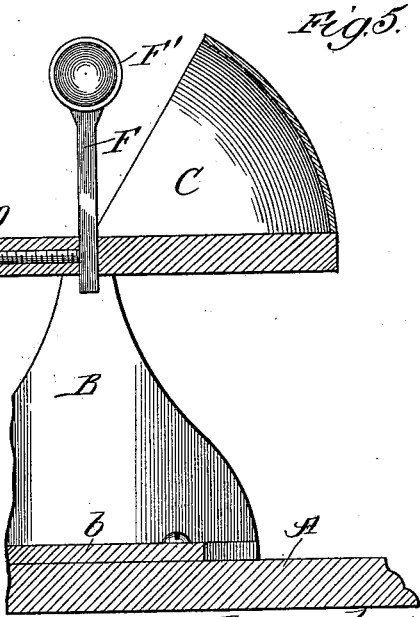
Witnesses: Inventor:
Chester J. Underwood,

UNITED STATES PATENT OFFICE.

CHESTER J. UNDERWOOD, OF ELGIN, ILLINOIS, ASSIGNOR OF ONE-HALF TO GEORGE SHEPPARD, OF SAME PLACE.

DENTAL APPLIANCE.

SPECIFICATION forming part of Letters Patent No. 626,737, dated June 13, 1899.

Application filed October 7, 1898. Serial No. 692,950. (No model.)

*To all whom it may concern:*

Be it known that I, CHESTER J. UNDERWOOD, a citizen of the United States, residing at Elgin, Illinois, have invented certain new and useful Improvements in Dental Appliances, of which the following is a specification.

The object of my invention is to make a tooth-crown-soldering device that will facilitate the soldering together of root-plates and crown-plates having the tooth-crown attached thereto or mounted thereon; and my invention consists in the features and details of construction hereinafter described and claimed.

Figure 1:
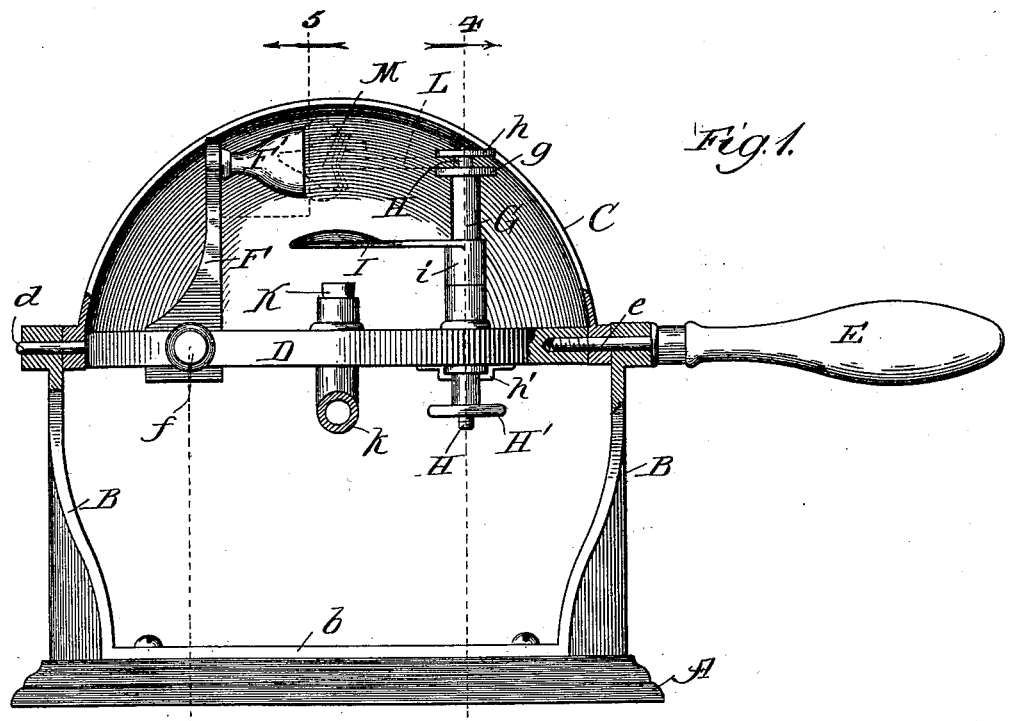
Figure 2:
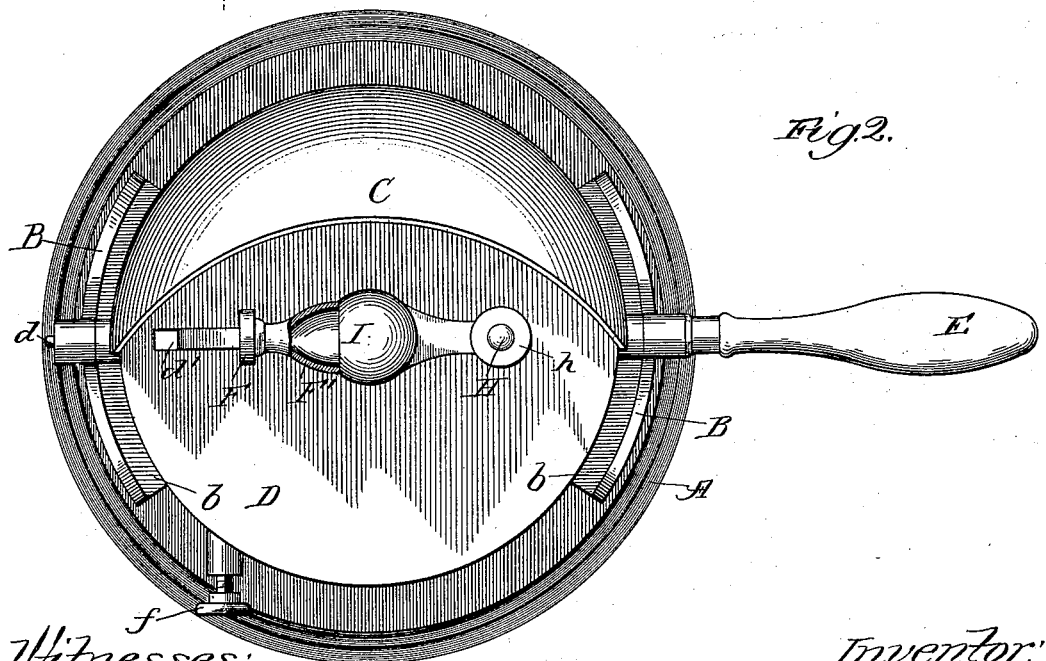

In the drawings, Figure 1 is a front elevation, partly in section, of my improved soldering apparatus; Fig. 2, a plan view of the same; Fig. 3, a side elevation; Fig. 4, a section taken on line 4 of Fig. 1, and Fig. 5 a section taken on line 5 of Fig. 1.

In making my improved soldering device I make a base A, which may be of wood or metal, as preferred. I mount a bracket B thereon, which may be cast with an integral connecting-piece $b$, which may be attached to the base by screws or in any other desired way. Where the base is also cast, I prefer to cast the base and brackets as a single integral piece. The brackets B afford standards or uprights at the opposite sides adapted to support the other parts, as hereinafter described, and form what may be considered as a supporting-frame. I make a hood C, formed like the section of a hollow globe and pivoted at the top of the upright brackets, so that it can be thrown over to the one side or the other as may be desired, and used indifferently on either side. The hood is intended to cover the operative parts when soldering is being done, so that it will confine the heat and prevent its undue loss or dissipation, and to be turned to the one side or the other when the soldering is not being done, so that it will not interfere with the insertion or removal of the parts intended to be soldered, as hereinafter explained. I arrange a disk or table D, also pivoted at the top of the brackets or supports, so that it can be attached or inclined at any desired angle to permit the one side or the other to be raised and lowered. The pivoting of the hood and table may be effected by the same means, and to this end I employ at one side a spindle $d$, which is preferably formed as an integral part of the table D, and at the other a screw $e$, forming preferably a part of a handle E, by which it may be turned in the one direction or the other. By turning the screw through means of the handle the disk or table D may be loosened or tightened in its bearings, so that it can be tipped or held stationary in a desired position, as may be preferred. I provide a slot $d'$ in the table, in which I mount a standard F, carrying an investment-cup F', to be used as hereinafter described. This standard may be adjusted back and forth at desired positions in the slot $d'$ by means of a screw $f$, so that it can be held at any desired position of adjustment. I arrange on the disk or table a hollow standard G, carrying a flange or head $g$. This standard is preferably attached to the disk or table by screw-threads, as shown in Fig. 4, although it may be attached in other desired ways, if preferred. I pass a rod H through the hollow standard G and provide it with a head $h$. The lower end of the rod is screw-threaded, so as to receive a nut H', by which the rod may be moved up or down. This nut is provided with a circumferential flange caught under the lip of a clip $h'$, (shown in Fig. 4,) so that as it is turned in the proper direction the rod H will be forced up. The head or flange $g$ and the head $h$ form a chuck or vise to be used as hereinafter explained. I mount on the standard a shield I through a sleeve $i$, which enables it to be turned toward the one side or the other into any desired position. I arrange on the disk or table a burner which has a pipe or hose $k$ connecting with the gas-supply, so that a desired flame may be maintained in the burner. The hood I is arranged above the burner, as will be seen from Fig. 1, so that by turning it to the one side or the other the flame from the burner can be applied to or shut off from the parts to which it is intended to be applied.

As used in soldering a root-plate and a crown-plate containing an artificial crown attached to it together, I place the pin L of the root-plate in the chuck formed by the heads g and h and by turning the nut H' bring the parts of the chuck sufficiently together to hold the root-plate firmly and securely in its desired horizontal position. The investment-cup is filled with a plastic material—as, for instance, plaster-of-paris—in which the tooth-crown M is embedded, so that it as the plastic material hardens will be held in its proper position. To do this, the investment-cup is moved up close enough to secure the proper investment of the tooth-crown and then held in its position of adjustment by turning the screw f, which holds it in place. In arranging the parts it will of course be understood that the root-plate and the crown-plate are placed in their proper position over the burner. The burner is then lighted and the shield I moved to the one side or the other, so that the heat and flame can be applied to the parts where the soldering is intended to be effected. The investment of the tooth-crown in the plaster-of-paris or similar material protects it from the heat, so that danger of cracking or checking is avoided. The table or disk D may be tipped or inclined to the one side or the other, as it is desired to apply the heat and flame to the one side or the other of the parts being soldered. The shield may be turned partially or wholly over the heat and flame at any time that it may be desired to regulate or adjust the same, by which means too-rapid melting of the wax holding the root-plate and the crown-plate together may be prevented. Of course it will be understood that the root-plate and the crown-plate are stuck or held together temporarily by wax until the soldering can be effected and that the soldering material will be applied in the usual way to the point where the soldering is to be effected. After the plates have been properly soldered together the flame may be extinguished or shut off, the pin of the root-plate removed from the chuck, and the tooth-crown removed from its investment.

What I regard as new, and desire to secure by Letters Patent, is—

1. In a tooth-crown-soldering device, the combination of an investment-cup adapted to protect and support the tooth-crown, and a chuck adapted to receive and hold the pin of a tooth root-plate, substantially as described.

2. In a tooth-crown-soldering device, the combination of an investment-cup adapted to protect and support a tooth-crown, a chuck adapted to receive and hold the pin of a tooth root-plate, and means for melting the wax attaching them together, substantially as described.

3. In a tooth-crown-soldering device, the combination of an investment-cup adapted to protect and support a tooth-crown, a chuck adapted to receive and hold the pin of a tooth root-plate, means for melting the wax attaching them together, and means for regulating the heat employed in melting the wax, substantially as described.

4. In a tooth-crown-soldering device, the combination of an investment-cup adapted to protect and support a tooth-crown, a chuck adapted to receive and hold the pin of a tooth root-plate, and means for adjusting the investment-cup into different desired positions, substantially as described.

5. In a tooth-crown-soldering device, the combination of a supporting-frame, a pivoted table or disk arranged therein, a pivoted hood, a burner, and means for holding the parts to be soldered, substantially as described.

CHESTER J. UNDERWOOD.

Witnesses:
  THOMAS A. BANNING,
  THOMAS B. MCGREGOR.